(12) United States Patent
Takahashi (10) Patent No.: US 11,397,156 B2
(45) Date of Patent: Jul. 26, 2022

(54) THERMAL CONDUCTIVITY DETECTOR (71) Applicant: SHIMADZU CORPORATION, Kyoto (JP)

(72) Inventor: Kazunori Takahashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 106 days.

(21) Appl. No.: 16/130,490

(22) Filed: Sep. 13, 2018

(65) Prior Publication Data

US 2020/0088662 A1  Mar. 19, 2020

(51) Int. Cl.
   G01N 25/18   (2006.01)
   G01N 1/44    (2006.01)
   G01N 1/40    (2006.01)

(52) U.S. Cl.
   CPC .............. *G01N 25/18* (2013.01); *G01N 1/40* (2013.01); *G01N 1/44* (2013.01)

(58) Field of Classification Search
   CPC  G01N 25/18; G01N 1/40; G01N 1/41; G01N 2030/383; G01N 2030/625
   See application file for complete search history.

(56) References Cited

U.S. PATENT DOCUMENTS

| | | | |
|---|---|---|---|
| 2,585,959 A * | 2/1952 | Minter ................. | G01N 27/185 73/25.03 |
| 3,451,255 A * | 6/1969 | Ikels .................... | G01N 30/468 73/23.35 |
| 3,683,671 A * | 8/1972 | Van Swaay ............ | G01N 30/66 422/89 |
| 3,693,403 A * | 9/1972 | Paul ........................ | G01N 9/00 73/23.35 |

(Continued)

FOREIGN PATENT DOCUMENTS

| | | | |
|---|---|---|---|
| GB | 1519842 A * | 8/1978 | ............. G01N 25/18 |
| JP | 53-46091 A | 4/1978 | |

(Continued)

OTHER PUBLICATIONS

Communication dated Jul. 9, 2019 by the Japanese Patent Office in application No. 2016-042972.

(Continued)

*Primary Examiner* — Herbert K Roberts
*Assistant Examiner* — Fatemeh Esfandiari Nia
(74) *Attorney, Agent, or Firm* — Sughrue Mion, PLLC (57) ABSTRACT

A Thermal Conductivity Detector ("TCD") including: a gas flow switching mechanism that switches between a first state where a measured gas is introduced into a first flow path and a reference gas is introduced into a second flow path, and a second state where the reference gas is introduced into the first flow path and the measured gas is introduced into the second flow path; a first filament unit connected to the first flow path and including a first filament; a second filament unit connected to the second flow path and including a second filament; and a detection circuit unit for detecting an electric signal in accordance with a change in voltage applied to or current through the first filament and the second filament. The first filament unit and the second filament unit have different detection characteristics of thermal conductivity of gas.

7 Claims, 7 Drawing Sheets

(56) References Cited

U.S. PATENT DOCUMENTS

| | | | | |
|---|---|---|---|---|
| 3,888,110 | A | * | 6/1975 | Clark ..................... G01N 30/66 73/23.4 |
| 3,910,765 | A | * | 10/1975 | Tinklepaugh .......... G01N 30/30 422/89 |
| 4,019,863 | A | * | 4/1977 | Jenkins .............. G01N 33/0026 73/864.81 |
| 4,185,490 | A | * | 1/1980 | Clouser ................. G01N 27/18 73/23.35 |
| 4,254,654 | A | * | 3/1981 | Clouser ................. G01N 30/62 73/23.4 |
| 4,316,382 | A | * | 2/1982 | Woodruff .............. G01N 27/18 73/23.2 |
| 4,594,879 | A | * | 6/1986 | Maeda ................... G01N 30/66 73/25.03 |
| 6,550,961 | B1 | * | 4/2003 | Ueda ..................... G01N 30/66 73/23.35 |
| 2002/0014106 | A1 | * | 2/2002 | Srinivasan ........... B01J 19/0046 73/23.42 |
| 2007/0266858 | A1 | * | 11/2007 | Alm ..................... G01N 30/463 96/105 |
| 2015/0089998 | A1 | * | 4/2015 | Tipler ................... G01N 30/66 73/23.42 |
| 2016/0103105 | A1 | * | 4/2016 | Nakama ................ G01N 25/18 73/23.4 |
| 2018/0087815 | A1 | * | 3/2018 | Kujak ................... G01N 25/18 |
| 2018/0100838 | A1 | * | 4/2018 | Galotta ................. G01N 31/12 |
| 2019/0041368 | A1 | * | 2/2019 | Nakama ................ G01N 30/32 |

FOREIGN PATENT DOCUMENTS

| | | | | |
|---|---|---|---|---|
| JP | 55-50150 | A | | 4/1980 |
| JP | 59-79149 | A | | 5/1984 |
| JP | 01234072 | A | * | 9/1989 ............... H02N 2/14 |
| JP | 2011169778 | | * | 2/1997 |

OTHER PUBLICATIONS

Luis A. Colon, et al., "Modern Practice of Gas Chromatography", 4th Edition, John Wiley & Sons, Aug. 4, 2004, pp. 277-298.

* cited by examiner

THERMAL CONDUCTIVITY DETECTOR

TECHNICAL FIELD

The present invention relates to a thermal conductivity detector (TCD).

BACKGROUND ART

A Thermal Conductivity Detector ("TCD") has been known as a detector used in gas chromatography. The TCD utilizes transfer of heat between a heating element (e.g. filament) and a fluid (e.g. gas) flowing around the heating element. The gas is introduced into a space in which the filament is accommodated, and is then discharged from the space.

The TCD is configured in such a way that a measuring filament is provided on one side of a Wheatstone bridge. In this system, an output signal easily drifts because the output signal is susceptible to the variance of the temperature of a cell block.

Figure 6:
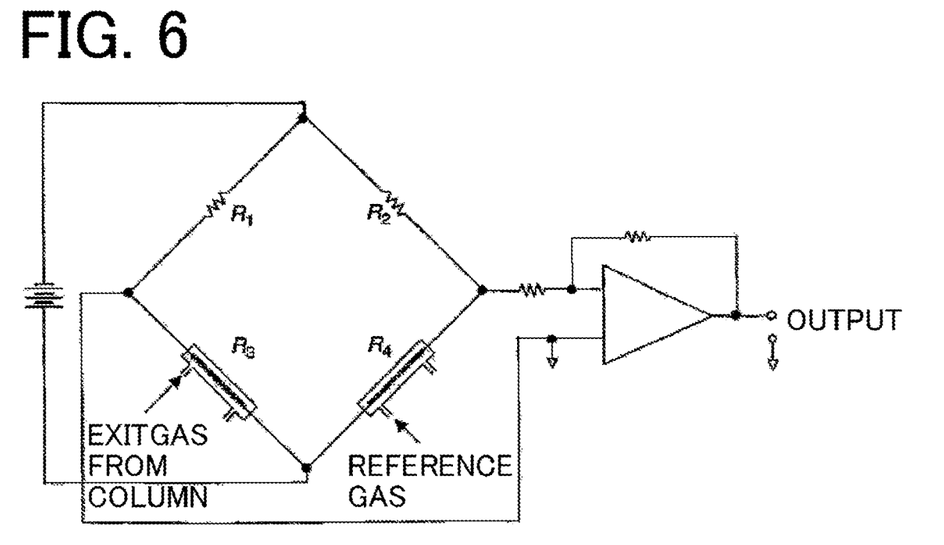
FIG. 6 is a conceptual diagram for describing a conventional TCD.
Figure 7:
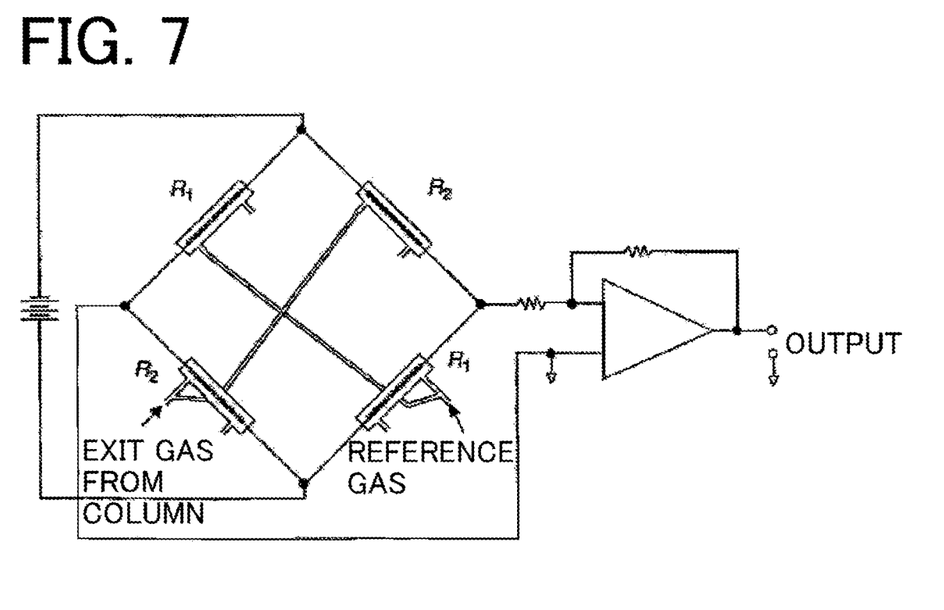
FIG. 7 is a conceptual diagram for describing a conventional TCD.

To suppress the influence due to the variance of the cell block temperature and the pressure fluctuation of gas, a structure has been proposed in which a measuring filament $R_3$ and a reference filament $R_4$ are provided on sides of the Wheatstone bridge as shown in FIG. 6 (see Non-Patent Document 1). Moreover, as shown in FIG. 7, a structure has also been proposed in which all sides of the Wheatstone bridge are filaments $R_1$ to $R_4$ (see Non-Patent Document 1).

However, since it is difficult to uniformize the characteristics of the measuring filament and the reference filament, it is impossible to fully eliminate the influence of the pressure fluctuation and the cell block temperature.

Hence, TCD of a gas switching type has been proposed (see Patent Documents 1 and 2, for example). The TCD controls whether a measured gas is introduced or only a carrier gas is introduced into a measuring filament, on the basis of a pressure difference caused by changing the inflow point of the carrier gas. Then, the TCD acquires a signal.

Figure 8:
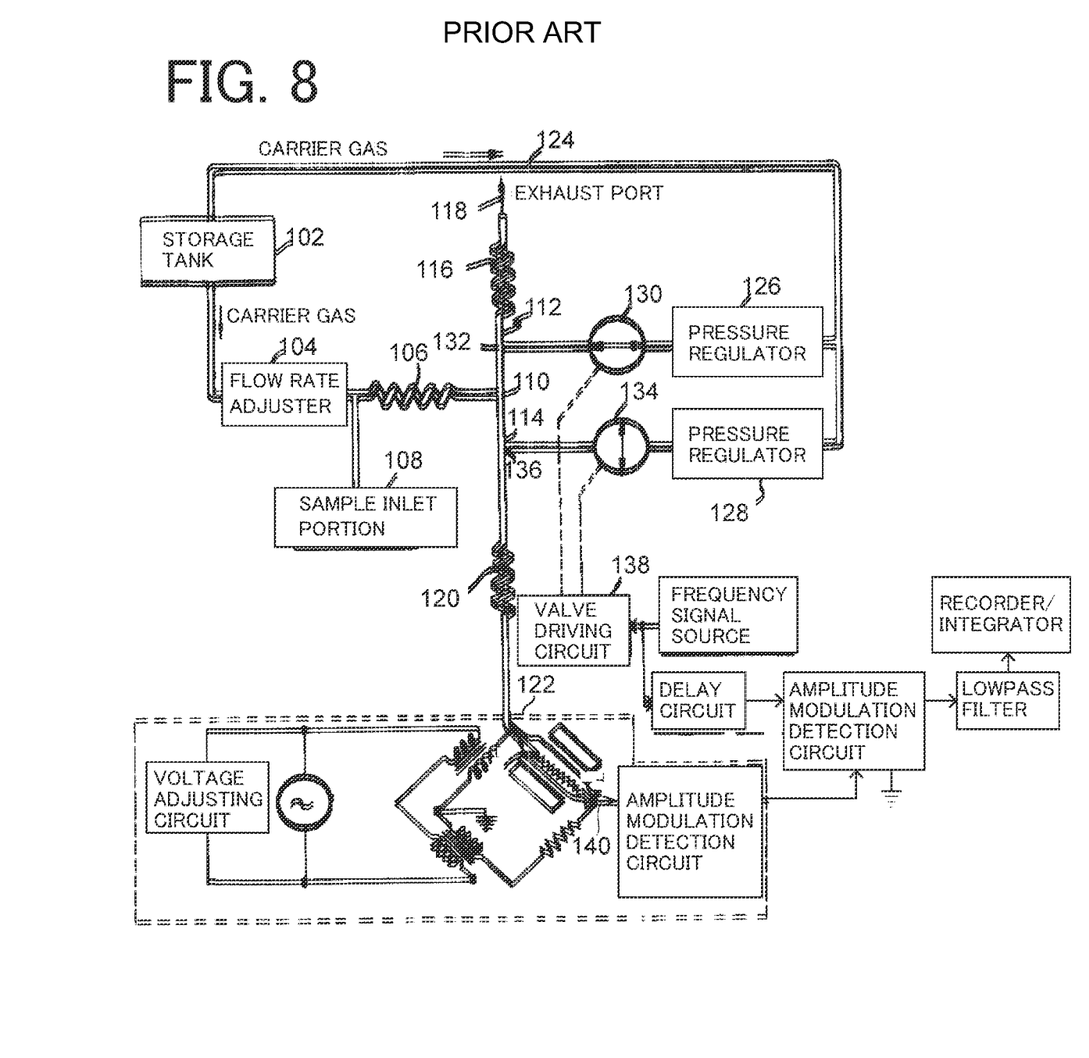
FIG. 8 is a configuration diagram of an entire gas chromatograph including a conventional gas switching type TCD.

FIG. 8 is a configuration diagram of an entire gas chromatograph including the TCD of the gas switching type.

A carrier gas is stored in a storage tank 102. A flow rate adjuster 104 is connected between a column 106 and the storage tank 102. A sample inlet portion 108 is connected to one end of the column 106. The column 106 has a function of separating each sample component over time.

Gas sent out from the column 106 is sent to pipe 112 or 114 through a connection portion 110. That is, the gas flowing into the pipe 112 is sent to an exhaust port 118 through a coiled pipe 116, where it is discarded into the atmosphere.

On the other hand, the gas flowing into the pipe 114 is sent to a detector 122 through a coiled pipe 120. The gas discharged from the column 106 is switched to flow into one of the pipes (112 or 114), according to a method described below.

The carrier gas stored in the storage tank 102 is sent to pressure regulators 126 and 128 through a pipe 124. The gas sent out from the pressure regulator 126 is sent to the pipe 112 through a valve 130. Here, a connection portion 132 of the valve 130 and the pipe 112 is positioned between the coiled pipe 116 and the connection portion 110.

Also, the gas sent out from the pressure regulator 128 is sent to the pipe 114 through a valve 134. Here, a connection portion 136 of the valve 134 and the pipe 114 is positioned between the coiled pipe 120 and the connection portion 110.

When the valve 130 is opened and the valve 134 is closed as shown in FIG. 8, the pressure of the carrier gas in the connection portion 132 is set to a predetermined pressure value by the pressure regulator 126. Here, the predetermined pressure value refers to a pressure sufficient to feed the gas (mixed gas of the carrier gas and the measured gas) discharged from the column 106 into the detector 122 through the coiled pipe 120.

On the other hand, when the valve 130 is closed and the valve 134 is opened, the pressure of the carrier gas in the connection portion 136 is set to a predetermined value by the pressure regulator 128. Here, the predetermined pressure refers to a pressure sufficient to send out the gas discharged from the column 106 to the exhaust port 118 through the coiled pipe 116. Accordingly, in this case (valve 130 is closed and valve 134 is opened), only the carrier gas is introduced into the detector 122.

With switching means described above, it is possible to select whether to introduce only the carrier gas, or to introduce the measured gas from the column 106, to the detector 122. It should be noted that a valve driving circuit 138 performs opening and closing control of the valves 130, 134.

Exhaust gas from the column 106 and carrier gas are alternately introduced into the detector 122. Accordingly, a bridge output signal 140 of the detector 122 is generated in the form of an AC signal. That is, a level difference between the bridge output signal 140 based on the gas discharged from the column 106 and the bridge output signal 140 based on the carrier gas is caused by components of the sample. Hence, when the measured gas is not included, these two output signal levels become equal.

It should be noted that, although the output voltage of the bridge output signal 140 gradually changes in level, this has a common effect on the above two signals. Accordingly, subtracting the bridge output signal level based on the carrier gas enables temporal drift of the detector 122 to be eliminated.

In this system, matching of the characteristics of the filaments, which has been a problem of the structure using the measuring filament and the reference filament, is unnecessary, and therefore, disturbance such as the influence of the cell block temperature can be eliminated.

PRIOR ART DOCUMENTS

Patent Documents

Patent Document 1: Japanese Patent Laid-open Publication No. S53-46091

Patent Document 2: Japanese Patent Laid-open Publication No. S55-50150

Non-Patent Document

Non-Patent Document 1: "Modern Practice of Gas Chromatography", Robert L. Grob and Eugene F. Barry, 4th Edition, John Wiley & Sons, 2004 Aug. 4, p. 277-298

SUMMARY OF THE INVENTION

Problems to be Solved by the Invention

As described above, regarding the TCD, attempts have been made to reduce the minimum detection amount and to widen the dynamic range. However, in chromatography, analytical conditions vary depending on the analyte. The measured gas flow rate accordingly varies under various conditions.

For example, in a structure optimized to exhibit its performance when the measured gas flow rate is small, the volume of a flow path in which a filament is disposed is small. Here, a large measured gas flow rate increases the flow velocity around the filament. Hence, there has been a problem that the influence of flow rate fluctuation tends to become an influence as signal noise, and the sensitivity and dynamic range are reduced due to the influence of forced convection.

On the other hand, in a structure optimized to exhibit its performance when the measured gas flow rate is large, the volume of the flow path is large. Hence, there has been a problem that a small sample flow rate causes the peak to tail, delays the response, and reduces the sensitivity and dynamic range due to dilution with a switching gas.

An objective of the present invention is to provide a TCD capable of achieving a high sensitivity and of widening the dynamic range, in both situations where the measured gas flow rate is relatively large and small.

Solutions to the Problems

A TCD of an embodiment of the present invention includes: a gas flow switching mechanism that switches between a first state where a measured gas is introduced into a first flow path and a reference gas is introduced into a second flow path, and a second state where the reference gas is introduced into the first flow path and the measured gas is introduced into the second flow path; a first filament unit connected to the first flow path and including a first filament; a second filament unit connected to the second flow path and including a second filament; and a detection circuit unit for detecting an electric signal in accordance with a change in voltage applied to or current through the first filament and the second filament. The first filament unit and the second filament unit have detection characteristics of thermal conductivity of gas that are different from each other.

Effects of the Invention

The TCD according to the embodiment of the present invention has two filament units having detection characteristics of thermal conductivity of gas that are different from each other, a high sensitivity can be achieved and the dynamic range can be widened, regardless of whether the measured gas flow rate is relatively large or small.

EMBODIMENTS OF THE INVENTION

For example, a TCD according to an embodiment of the present invention may be configured in such a way that a first filament unit is optimized to exhibit its performance (the S/N ratio (signal-to-noise ratio) increases) when the measured gas flow rate is relatively small, and a second filament unit is optimized to exhibit its performance (the S/N ratio increases) when the measured gas flow rate is relatively large.

When measurement is performed under the analytical condition of a relatively small measured gas flow rate, a signal detected by a first filament of the first filament unit is used. When measurement is performed under the analytical condition of a relatively large measured gas flow rate, a signal detected by a second filament of the second filament unit is used. This enables the TCD of the embodiment of the present invention to achieve a high sensitivity (or large S/N ratio) and to widen the dynamic range, in both situations where the measured gas flow rate is relatively large and small.

Further, in the TCD according to the embodiment of the present invention, only by adding one filament mainly without largely changing the structure of the TCD, the minimum detection amount is improved as a TCD. It is also possible to widen the dynamic range of the TCD to expand the flow range in which performance can be demonstrated.

In the TCD according to the embodiment of the present invention, for example, at least one of the length, the thickness, the shape, the material, the arrangement, and the dimension of the surrounding space may differ between the first filament and the second filament. This enables to assign different detection characteristics of thermal conductivity of gas to the first filament unit and the second filament unit. It should be noted that the arrangement of the first filament refers to the arrangement of the first filament in the first filament unit. Also, the arrangement of the second filament refers to the arrangement of the second filament in the second filament unit.

Moreover, in the TCD according to the embodiment of the present invention, for example, the shape of the first filament unit and the shape of the second filament unit are any one of a direct type, a semi-diffusion type, and a diffusion type, and the dimension of the surrounding space may differ between the first filament and the second filament. This enables to assign different detection characteristics of thermal conductivity of gas to the first filament unit and the second filament unit.

It should be noted that the direct filament unit means that the cross-sectional area of the filament unit is substantially the same as the cross-sectional area of the flow path connected to the filament unit. Further, the semi-diffusion type filament unit means that the cross-sectional area of the filament unit is larger than the cross-sectional area of the flow path connected to the filament unit. In addition, the diffusion type filament unit means that the cross-sectional area of the filament unit is larger than the cross-sectional area of the flow path connected to the filament unit, and a columnar or protruding structure for diffusing the fluid is placed at the entrance of the filament unit.

In addition, the detection circuit unit may, for example, include a first detection circuit for detecting the electric signal of the first filament, and a second detection circuit for detecting the electric signal of the second filament. This enables to detect and output the change in thermal conductivity in the first filament unit and the change in thermal conductivity in the second filament unit at the same time.

Further, the detection circuit unit may, for example, include a detection circuit for detecting the electric signal, and a switch circuit that is operable to switch between the first filament and the second filament to electrically connect the detection circuit by. This simplifies the circuit configuration of the detection circuit unit and reduces the manufacturing cost, as compared to the case where the detection circuit is provided for each of the first and second filaments.

In addition, the gas flow switching mechanism may, for example, include: a branch flow path having one end connected to the first flow path, the other end connected to the second flow path, and a middle portion connected to a measured gas flow path for introducing the measured gas; the first reference gas flow path connected to the one end of the branch flow path; the second reference gas flow path connected to the other end of the branch flow path; and a switching valve that is operable to switch a path for introducing the reference gas between the first reference gas flow path and the second reference gas flow path to connect a path for introducing the reference gas. As a result, switching the inflow point of the reference gas with the switching valve enables the measured gas and the reference gas to be alternately introduced into the first flow path, while conversely, the reference gas and the measured gas can be alternately introduced into the second flow path.

Hereinafter, an embodiment of the present invention will be described in detail with reference to the drawings.

Figure 1:
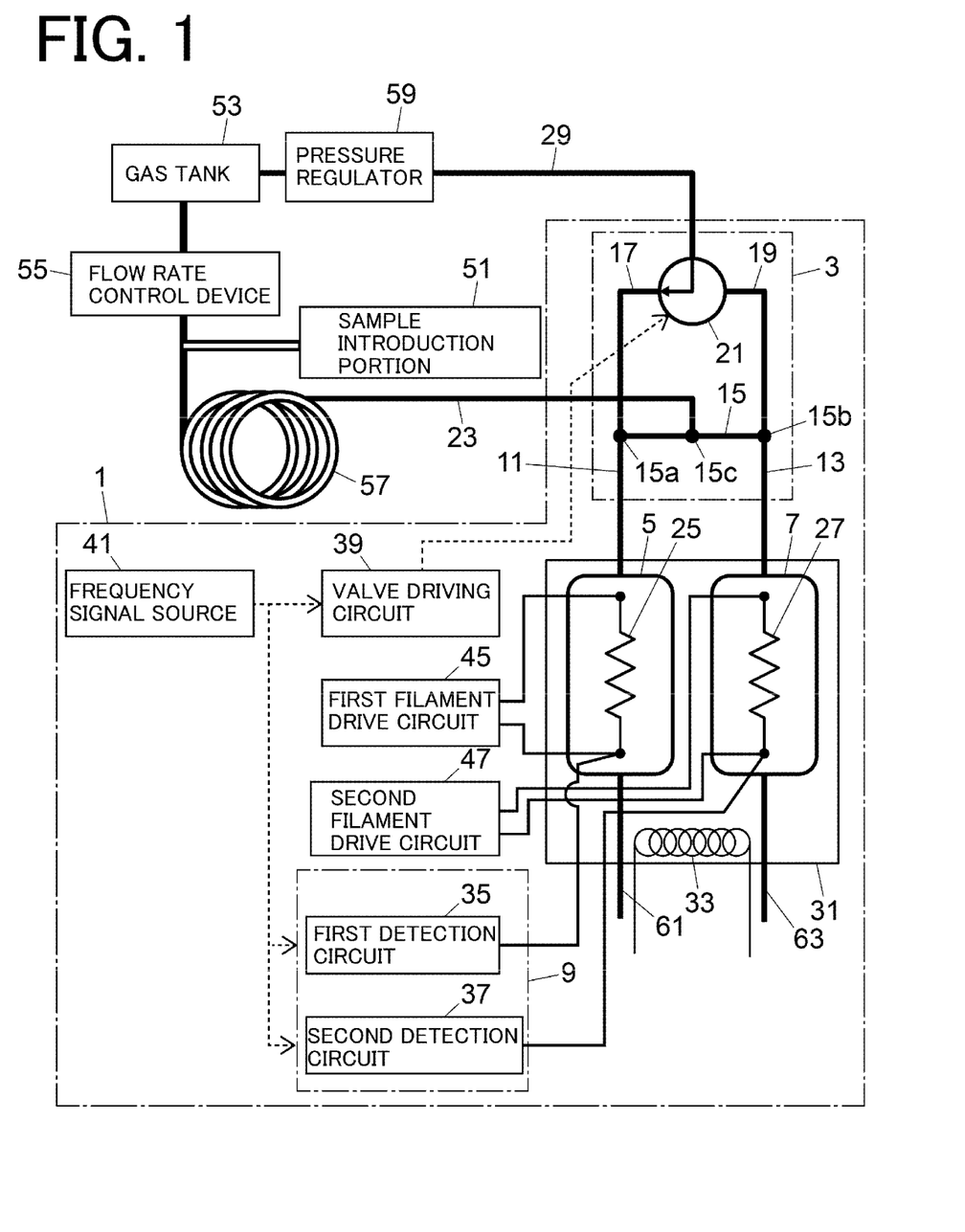
FIG. 1 is a schematic configuration diagram for describing an example of a gas chromatograph including an embodiment of a TCD.

FIG. 1 is a schematic configuration diagram for describing an example of a gas chromatograph including an embodiment of a TCD.

The gas chromatograph has a TCD 1 as a detector. The TCD 1 includes a gas flow switching mechanism 3, a first filament unit 5, a second filament unit 7, and a detection circuit unit 9.

The gas flow switching mechanism 3 switches the inflow point of a reference gas, to switch between a first state where a measured gas is introduced into a first flow path 11 and only the reference gas is introduced into a second flow path 13, and a second state where only the reference gas is introduced into the first flow path 11 and the measured gas is introduced into the second flow path 13. For example, the gas flow switching mechanism 3 includes a branch flow path 15, a first reference gas flow path 17, a second reference gas flow path 19, and a switching valve 21.

The branch flow path 15 is configured in such a way that one end 15*a* is connected to the first flow path 11, the other end 15*b* is connected to the second flow path 13, and a middle portion 15*c* is connected to a measured gas flow path 23 for introducing the measured gas.

The first reference gas flow path 17 is connected to the one end 15*a* of the branch flow path 15. The second reference gas flow path 19 is connected to the other end 15*b* of the branch flow path 15. The switching valve 21 is formed of a three-way valve, for example, and connects a reference gas flow path 29 for introducing the reference gas by switching between the first reference gas flow path 17 and the second reference gas flow path 19.

In the TCD 1, the first filament unit 5 is connected to the first flow path 11. The first filament unit 5 includes a first filament 25. The second filament unit 7 is connected to the second flow path 13. The second filament unit 7 includes a second filament 27. The first filament unit 5 and the second filament unit 7 are accommodated in a cell block 31. The temperature of the cell block 31 is kept at a constant temperature by means of a heater 33.

The detection circuit unit 9 detects an electric signal in accordance with a change in voltage applied to or current through the first filament 25 and the second filament 27. The detection circuit unit 9 includes a first detection circuit 35 for detecting the electric signal of the first filament 25 and a second detection circuit 37 for detecting the electric signal of the second filament 27.

In the TCD 1, the switching valve 21 is switched under the control of a valve driving circuit 39. The valve driving circuit 39 switches the switching valve 21 in response to signals at a constant cycle received from a frequency signal source 41.

A first filament drive circuit 45 applies a voltage to the first filament 25. A second filament drive circuit 47 applies a voltage to the second filament 27. The filament drive circuits 45, 47 control the voltage applied to the filaments 25, 27, so that the current flowing through the filaments 25, 27 is constant, or the resistance value of the filaments 25, 27 is constant.

The first detection circuit 35 measures the voltage applied to the first filament 25. The second detection circuit 37 measures the voltage applied to the second filament 27. The detection circuits 35, 37 synchronize the measurement timing in response to a signal received from the frequency signal source 41. Thus, the voltage of the filaments 25, 27 is detected in synchronization with the switch timing of the switching valve 21.

In the gas chromatograph shown in FIG. 1, a measurement sample is turned into a measured gas after being introduced and then heated in a sample introduction unit 51, and mixed with a carrier gas supplied from a gas tank 53, the carrier gas having a flow rate adjusted by a flow control device 55. The measured gas then passes through a separation column 57. The measured gas is separated by the separation column 57, and is then sent to the measured gas flow path 23.

Meanwhile, the carrier gas from the gas tank 53 is turned into a reference gas through a pressure regulator 59, and is sent to the reference gas flow path 29. The pressure of the reference gas is adjusted to a constant pressure by the pressure regulator 59, and the reference gas is sent to the switching valve 21 through the reference gas flow path 29.

When the switching valve 21 is electrically connected with the first reference gas flow path 17, the measured gas having reached the middle portion 15*c* of the branch flow path 15 through the measured gas flow path 23 is swept away by the reference gas, and is introduced into the second filament unit 7 through the second flow path 13. At this time, only the reference gas is introduced into the first flow path 11 and the first filament unit 5, from the first reference gas flow path 17.

Meanwhile, when the switching valve 21 is electrically connected with the second reference gas flow path 19, the measured gas having reached the middle portion 15*c* of the branch flow path 15 is swept away by the reference gas, and is introduced into the first filament unit 5 through the first flow path 11. At this time, only the reference gas is introduced into the second flow path 13 and the second filament unit 7, from the second reference gas flow path 19.

The gas having passed through the first filament unit 5 is discharged from the exhaust port 61 and the gas having passed through the second filament unit 7 is discharged from the exhaust port 63, to the outside of the cell block 31.

The gas flow switching mechanism 3 utilizing the pressure difference described above is capable of switching between a first state where the measured gas is introduced into the first filament unit 5 while the reference gas is introduced into the second filament unit 7, and a second state where the measured gas is introduced into the second filament unit 7 while the reference gas is introduced into the first filament unit 5.

For example, by operating the switching valve 21 at a constant cycle of about 100 milliseconds, signals of the measured gas and the reference gas can be acquired by the first filament unit 5 and the second filament unit 7, respectively. Then, by subtracting the difference between the signals, a chromatogram of the measured gas can be obtained. Detection signals of the detection circuits 35, 37 are, for example, output to a work station, a personal computer, or the like outside the gas chromatograph.

In the TCD 1, the first filament unit 5 and the second filament unit 7 have different detection characteristics of thermal conductivity of gas. For example, at least one of the length, the thickness, the shape, the material, the arrangement, and the dimension of the surrounding space differs between the first filament 25 and the second filament 27.

Figure 2:
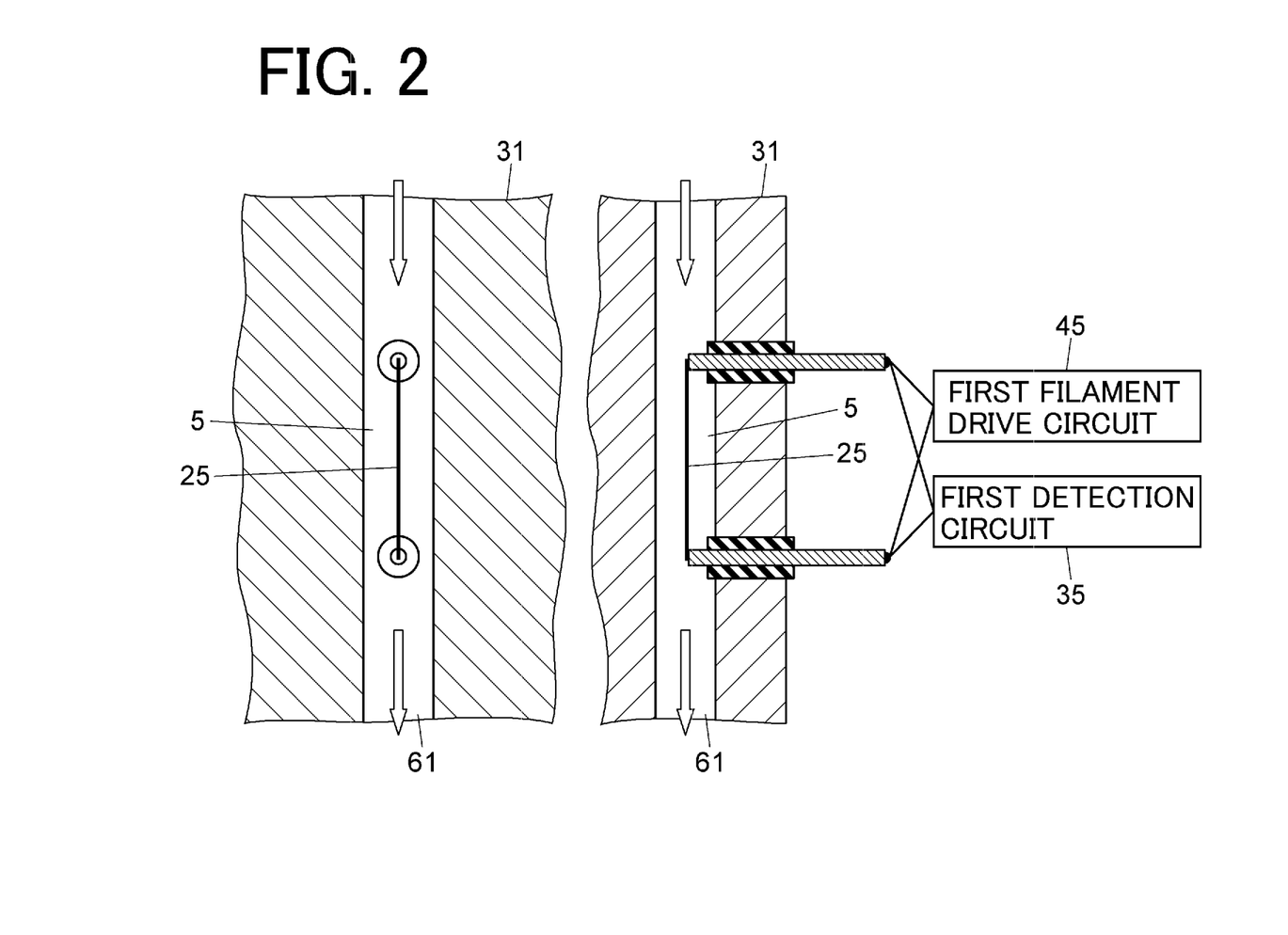
FIG. 2 is a schematic cross section in plan view and cross section in side view for describing a configuration example of a first filament unit.
Figure 3:
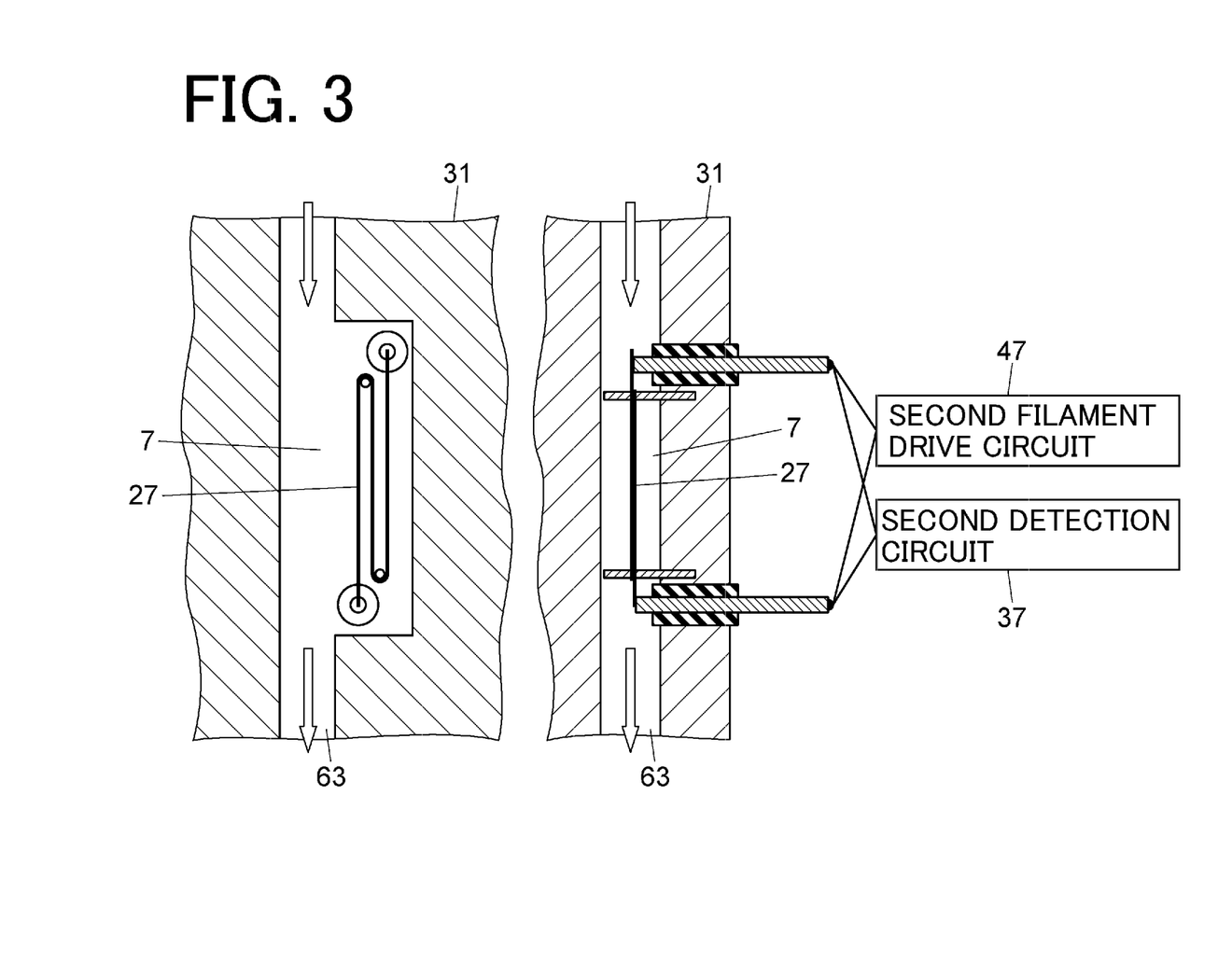
FIG. 3 is a schematic cross section in plan view and cross section in side view for describing a configuration example of a second filament unit.

For example, as shown in FIG. 2, the first filament unit 5 has a direct shape and includes the first filament 25 having a linear shape. Meanwhile, as shown in FIG. 3, the second filament unit 7 has a semi-diffusion shape and includes the second filament 27 having a zigzag shape.

Thus, the dimension of the surrounding space and the filament length differ between the first filament 25 and the second filament 27. It should be noted that, the first filament 25 and the second filament 27 are made of the same tungsten material and have the same thickness. It should be noted, however, that the material and thickness may differ between the first filament 25 and the second filament 27.

Compared to the second filament unit 7, the first filament unit 5 has a smaller space surrounding the filament and a shorter filament length. Hence, the first filament unit 5 can achieve a higher sensitivity (larger S/N ratio) and a wider dynamic range when the measured gas flow rate is relatively small. Conversely, compared to the first filament unit 5, the second filament unit 7 can achieve a higher sensitivity (larger S/N ratio) and a wider dynamic range when the measured gas flow rate is relatively large.

When measurement is performed under the analytical condition of a relatively large measured gas flow rate, the first filament unit 5 is more susceptible to pressure disturbance. Hence, noise increases, the S/N ratio deteriorates, and the minimum detection amount decreases. Linearity also deteriorates and the dynamic range is reduced. Accordingly, by using the second filament unit 7 optimized for the condition of a large measured gas flow rate, the influence of pressure disturbance can be suppressed to improve the minimum detection amount, ensure linearity, and improve the dynamic range.

Meanwhile, when measurement is performed under the analytical condition of a small measured gas flow rate, the second filament unit 7 optimized for the condition of a large flow rate has the following problems. Specifically, the large cell volume delays the response, and causes the peak of the chromatogram to, for example, tail. Accordingly, by using the first filament unit 5 optimized for the condition of a small flow rate, the sensitivity can be increased to improve the minimum detection amount, ensure linearity, and improve the dynamic range.

In this manner, the TCD 1 selects between the detection signal of the first detection circuit 35 and the detection signal of the second detection circuit 37 according to the measured gas flow rate. With this, a high sensitivity can be achieved and the dynamic range can be widened regardless of whether the measured gas flow rate is relatively large or small. It should be noted that which of the detection signals of the first detection circuit 35 and the second detection circuit 37 is selected may be determined by the operator, or may be determined automatically by software according to the measured gas flow rate.

It should be noted that since the measured gas and the reference gas are alternately introduced into the first filament unit 5 while the reference gas and the measured gas are alternately introduced into the second filament unit 7, it is also possible to output a detection signal of the first detection circuit 35 and a detection signal of the second detection circuit 37 for the same measured gas.

Specific configuration examples for assigning different detection characteristics of thermal conductivity of gas to the first filament unit 5 and the second filament unit 7 have been described with reference to FIGS. 2 and 3. However, the configurations of the first filament unit 5 and the second filament unit 7 are not limited thereto.

Figure 4:
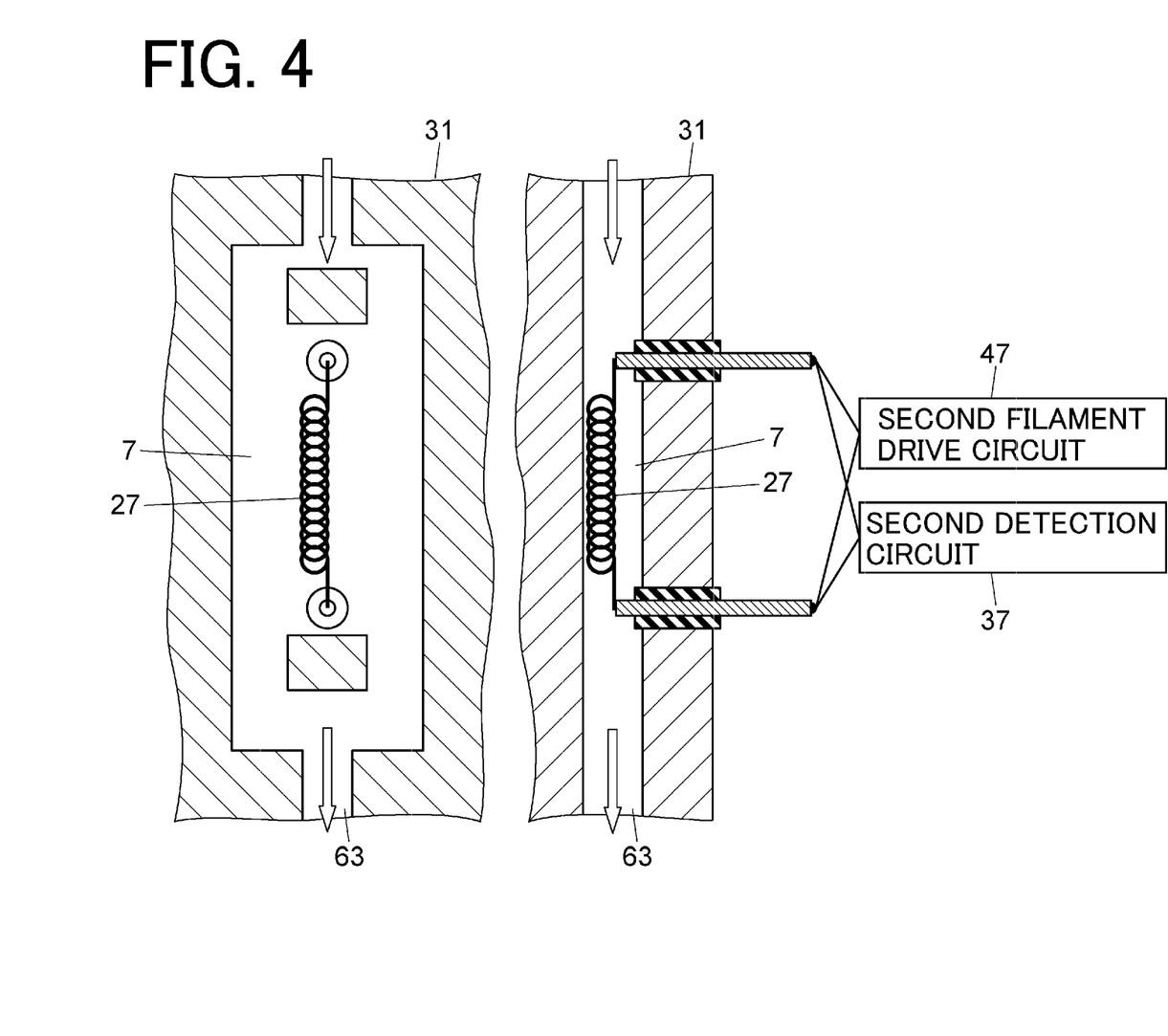
FIG. 4 is a schematic cross section in plan view and cross section in side view for describing another configuration example of the second filament unit.

For example, as shown in FIG. 4, the second filament unit 7 may have a diffusion type shape and include a coiled second filament 27. Compared to the configuration shown in FIG. 3, this configuration of the second filament unit 7 can achieve a higher sensitivity and a wider dynamic range even when the measured gas flow rate is larger still.

If at least one of the length, the thickness, the shape, the material, the arrangement, and the dimension of the surrounding space differs between the first filament 25 and the second filament 27, it is possible to assign different detection characteristics of thermal conductivity of gas to the first filament unit 5 and the second filament unit 7.

Further, contrary to the above-described embodiment, a configuration may be adopted in which the first filament unit 5 is optimized for a relatively large measured gas flow rate and the second filament unit 7 is optimized for a relatively small measured gas flow rate, as a matter of course.

Figure 5:
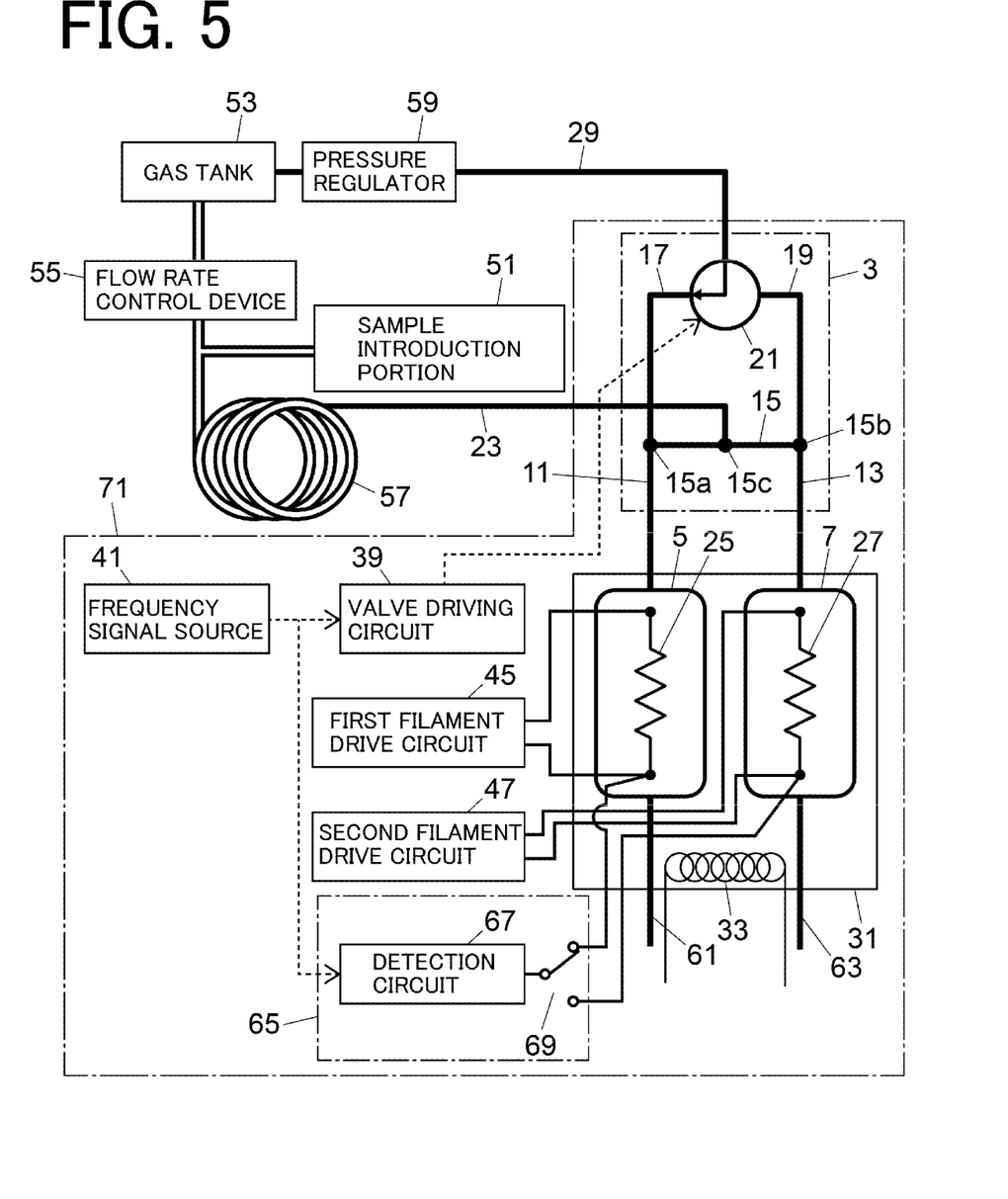
FIG. 5 is a schematic configuration diagram for describing an example of a gas chromatograph including another embodiment of a TCD.

Next, an example of a gas chromatograph including another embodiment of a TCD will be described with reference to FIG. 5. In FIG. 5, the same reference numerals are assigned to parts which perform the same function as in FIG. 1.

In the gas chromatograph shown in FIG. 5, a detection circuit unit 65 of a TCD 71 includes one detection circuit 67, and a switch circuit 69 that is operable to electrically connect the detection circuit 67 by switching between a first filament 25 and a second filament 27. The switch circuit 69 connects the detection circuit 67 to either the first filament 25 or the second filament 27 automatically, based on, for example, a signal from the outside or according to the measured gas flow rate. Thus, it is possible to select an appropriate detection condition according to the measured gas flow rate, and a high sensitivity can be achieved and the dynamic range can be widened, regardless of whether the measured gas flow rate is relatively large or small.

Compared to the TCD 71 shown in FIG. 1, the TCD 1 of this embodiment has a simpler circuit configuration of the detection circuit unit. Hence, it is possible to reduce the cost of the TCD.

It should be noted that the embodiments of the present invention including the configurations, arrangements, numerical values, and materials described in the embodiments are merely shown by way of illustration, and the scope of the present invention is not limited thereto. Various modifications are possible within the scope of the present invention described in the claims.

DESCRIPTION OF REFERENCE SIGNS 1, 71: TCD
3: Gas flow switching mechanism
5: First filament unit
7: Second filament unit
9, 65: Detection circuit unit
11: First flow path
13: Second flow path
15: Branch flow path
15a: One end of branch flow path
15b: Other end of branch flow path
15c: Middle portion of branch flow path
17: First reference gas flow path
19: Second reference gas flow path
21: Switching valve
25: First filament
27: Second filament
29: Reference gas flow path
35: First detection circuit
37: Second detection circuit
67: Detection circuit
69: Switch circuit

The invention claimed is:

1. A single gas chromatograph comprising:
a single separation column for separating a measured gas,
a first flow path and a second flow path which are each fluidly connected to the single separation column,
a gas flow switching element for switching alternately between a first state where the measured gas is introduced into the first flow path from the single separation column and a reference gas is introduced into the second flow path, and a second state where the reference gas is introduced into the first flow path and the measured gas is introduced into the second flow path from the single separation column;
a driving circuit configured to switch the gas flow switching element at a constant cycle,
a first filament unit connected to the first flow path and including a first filament;
a second filament unit connected to the second flow path and including a second filament;
a first detection circuit unit for detecting a first electric signal in accordance with a change in voltage applied to or current through the first filament; and
a second detection circuit unit for detecting a second electric signal in accordance with a change in voltage applied to or current through the second filament, wherein
the first filament unit and the second filament unit have detection characteristics of thermal conductivity of gas that are different from each other, the single gas chromatograph is further configured to obtain, with respect to the measured gas which flowed out from the single separation column, the first electric signal by the first detection circuit unit and the second electric signal by the second detection circuit unit, and
the single gas chromatograph is further configured to obtain a first chromatogram based on a difference between the first electric signal obtained at a first timing when the measured gas is introduced into the first flow path and the first electrical signal obtained at a second timing when the reference gas is introduced into the first flow path, and to obtain a second chromatogram based on a difference between the second electric signal obtained at the second timing when the measured gas is introduced into the second flow path and the second electrical signal obtained at the first timing when the reference gas is introduced into the second flow path.

2. The gas chromatograph according to claim 1, wherein at least one of a length, a thickness, a shape, a material, an arrangement, and a dimension of a surrounding space differs between the first filament and the second filament.

3. The gas chromatograph according to claim 2, wherein the shape of the first filament unit and the shape of the second filament unit are any one of a direct type, a semi-diffusion type, and a diffusion type, and the dimension of the surrounding space differs between the first filament and the second filament.

4. The gas chromatograph according to claim 1, wherein the Signal to Noise (S/N) ratio of the first filament unit increases when a measured gas flow rate is relatively small, and the S/N ratio of the second filament unit increases when the measured gas flow rate is relatively large.

5. The gas chromatograph according to claim 1, wherein the gas flow switching mechanism includes:
a branch flow path having one end connected to the first flow path, the other end connected to the second flow path, and a middle portion connected to a measured gas flow path for introducing the measured gas;
a first reference gas flow path connected to the one end of the branch flow path;
a second reference gas flow path connected to the other end of the branch flow path; and
a switching valve that is operable to, switch a path for introducing the reference gas between the first reference gas flow path and the second reference gas flow path for its connection.

6. A single gas chromatograph comprising:
a single separation column for separating a measured gas,
a first flow path and a second flow path which are each fluidly connected to the single separation column,
a gas flow switching element for switching alternately between a first state where the measured gas is introduced into the first flow path from the single separation column and a reference gas is introduced into the second flow path, and a second state where the reference gas is introduced into the first flow path and the measured gas is introduced into the second flow path from the single separation column;
a first filament unit connected to the first flow path and including a first filament;
a second filament unit connected to the second flow path and including a second filament;
a detection circuit unit for detecting an electric signal in accordance with a change in voltage applied to or current through the first filament and the second filament;
a switch circuit that is configured to switch between the first filament and the second filament to electrically connect the detection circuit; and the first filament unit and the second filament unit have detection characteristics of thermal conductivity of gas that are different from each other.

7. A single thermal conductivity detector comprising:
a measured gas flow path through which a measured gas flowed out from a single separation column,
a first flow path and a second flow path which are each fluidly connected to the measured gas flow path,
a gas flow switching element for switching alternately between a first state where the measured gas is introduced into the first flow path through the measured gas flow path and a reference gas is introduced into the second flow path, and a second state where the reference gas is introduced into the first flow path and the measured gas is introduced into the second flow path through the measured gas flow path;
a driving circuit configured to switch the gas flow switching element at a constant cycle,
a first filament unit connected to the first flow path and including a first filament;
a second filament unit connected to the second flow path and including a second filament;
a first detection circuit unit for detecting a first electric signal in accordance with a change in voltage applied to or current through the first filament;
a second detection circuit unit for detecting a second electric signal in accordance with a change in voltage applied to or current through the second filament, wherein
the first filament unit and the second filament unit have detection characteristics of thermal conductivity of gas that are different from each other,
the single thermal conductivity detector is further configured to obtain, with respect to the measured gas which flowed out from the single separation column, the first electric signal by the first detection circuit unit and the second electric signal by the second detection circuit unit;
the single gas chromatograph is further configured to obtain a first chromatogram based on a difference between the first electric signal obtained at a first timing when the measured gas is introduced into the first flow path and the first electrical signal obtained at a second timing when the reference gas is introduced into the first flow path the and a second chromatogram based on a difference between the second electric signal obtained at the second timing when the measured gas is introduced into the second flow path and the second electrical signal obtained at the first timing when the reference gas is introduced into the second flow path.

* * * * *